United States Patent Office 3,184,060
Patented May 18, 1965

3,184,060
PACKAGING TACKY LATEX EMULSION PAINTS IN CONTAINERS MANUFACTURED FROM POLYOLEFINIC MATERIALS
Frank M. Harris, Phoenix, Md., assignor to Owens-Illinois Glass Company, a corporation of Ohio
No Drawing. Filed Feb. 13, 1963, Ser. No. 258,123
2 Claims. (Cl. 206—84)

This invention relates to a new article of manufacture and methods of making same, and more particularly, it relates to novel and improved methods of packaging latex emulsion paints which are tacky. One particularly important application of the invention is in providing a container for latex emulsion paints made by emulsion polymerization processes.

The polyolefinic materials of which the container is fabricated may be prepared as described in U.S. Patent No. 2,825,721 to J. P. Hogan et al. The polyolefinic material produced by this patent is known as high density polyolefinic material having a density between .941–.965 gram per cubic centimeter (ASTM test D–1505–60T). Additionally, it has a melt index of between .1 and 2.0 (ASTM D–1238–57T). The preferred density is .95 gram per cubic centimeter and the preferred melt index is .5 or less.

An object of this invention is to provide a packaging container which is physically and chemically compatible with the latex emulsion or other tacky material of the same type so that after storage in shipment, no deleterious effect is seen.

This and other objects and advantages of the invention will be apparent to those skilled in the art from the following specification.

Broadly, the invention comprises employing a polyolefinic material as prepared by Hogan et al. in U.S. Patent No. 2,825,721 such as polyethylene, having a density of approximately .95 and a melt index of .5. This material is processed by conventional means such as by extrusion molding or by blow molding, as is well known in the art, into containers for the tacky latex emulsion paint. The container may have a threaded or snap-on closure arrangement in order to provide a suitable seal to the container for the latex emulsion type paint. By this means, an efficient and easily assembled unit may be achieved being a large container for the paint having a screw type arrangement or the conventional friction type closure employed in metal containers.

It is not intended that this invention be limited to the examples or modifications which have been described merely for the sake of illustration, but only by the append claims in which it is intended to claim all novelty inherent to the invention as well as all modifications coming within the scope and spirit of the invention.

I claim:
1. A package comprising a substantially rigid container substantially filled with a tacky latex emulsion paint, said container comprising walls with inner surfaces of a high density polyethylene having a density of between about .941 and .965 gram per cubic centimeter and a melt index of between .1 and 2.0.
2. A package as defined in claim 1 wherein said polyethylene has a density of approximately .95 and a melt index of less than .5.

No references cited.

THERON E. CONDON, Primary Examiner.
EARLE J. DRUMMOND, Examiner.